United States Patent
Cheng et al.

(10) Patent No.: US 12,502,024 B2
(45) Date of Patent: Dec. 23, 2025

(54) NONSTICK PAN AND MANUFACTURING METHOD THEREOF

(71) Applicants: ZHEJIANG SANHE KITCHENWARE CO., LTD., Cixi (CN); Sichuan Jiuchuang Technology Co., Ltd., Mianyang (CN)

(72) Inventors: Qiang Cheng, Cixi (CN); Cheng Fang, Cixi (CN); Dechang Huang, Cixi (CN); Lin Li, Cixi (CN)

(73) Assignees: ZHEJIANG SANHE KITCHENWARE CO., LTD., Cixi (CN); SICHUAN JIUCHUANG TECHNOLOGY CO., LTD., Mianyang (CN)

(*) Notice: Subject to any disclaimer, the term of this patent is extended or adjusted under 35 U.S.C. 154(b) by 44 days.

(21) Appl. No.: 18/637,494

(22) Filed: Apr. 17, 2024

(65) Prior Publication Data

US 2025/0176755 A1    Jun. 5, 2025

(30) Foreign Application Priority Data

Dec. 4, 2023 (CN) .......................... 202323287297.8

(51) Int. Cl.
   *A47J 36/02*      (2006.01)
   *B21D 51/18*      (2006.01)

(52) U.S. Cl.
   CPC .......... *A47J 36/025* (2013.01); *B21D 51/18* (2013.01)

(58) Field of Classification Search
   CPC ........... A47J 36/025; A47J 36/02; B65D 1/40; B21D 51/22; B21D 51/18; B21D 51/16; Y10S 220/912

(Continued)

(56) References Cited

U.S. PATENT DOCUMENTS

| | | | | |
|---|---|---|---|---|
| 5,628,426 | A | * | 5/1997 | Doyle ................... A47J 27/022 99/425 |
| 2003/0129669 | A1 | * | 7/2003 | Veerapandian .... G01N 33/5076 702/19 |

(Continued)

FOREIGN PATENT DOCUMENTS

| | | |
|---|---|---|
| CN | 103844877 A | 6/2014 |
| CN | 204091653 U | 1/2015 |

(Continued)

OTHER PUBLICATIONS

Translation of CN213588026U, Chengbo et al., Jul. 2, 2021, Paragraph 43 Lines 1-7. (Year: 2021).*

*Primary Examiner* — Robert J Hicks
(74) *Attorney, Agent, or Firm* — Bayramoglu Law Offices

(57) ABSTRACT

A nonstick pan includes a pan body, where an inner surface of the pan body is provided with protruding dots; the protruding dots include a central protruding dot and surrounding protruding dots; the central protruding dot is located at a center of the inner surface of the pan body and surrounded by protruding dot rings that are distributed from inside to outside around the central protruding dot; the protruding dot ring includes a plurality of surrounding protruding dots separated from each other; the central protruding dot and the surrounding protruding dots have a protrusion height of H; concave portions are formed between the central protruding dot and the surrounding protruding dot and between the surrounding protruding dots on the inner surface of the pan body; and a nonstick layer is provided on the concave portions on the inner surface of the pan body.

18 Claims, 4 Drawing Sheets

(58) Field of Classification Search
USPC ............ 220/573.2, 573.1, 912, 62.17, 62.13; 427/271; 72/379.6, 379.4
See application file for complete search history.

(56) References Cited

U.S. PATENT DOCUMENTS

2008/0105689 A1\* 5/2008 Ren .................. A47J 27/002
220/573.2
2015/0157160 A1 6/2015 Lee et al.

FOREIGN PATENT DOCUMENTS

| | | | | |
|---|---|---|---|---|
| CN | 209047877 U | 7/2019 | | |
| CN | 210446632 U | 5/2020 | | |
| CN | 212394555 U | 1/2021 | | |
| CN | 213588026 U | 7/2021 | | |
| CN | 117582109 A | 2/2024 | | |
| CN | 221769760 U | 9/2024 | | |
| GB | 2194879 A | \* | 3/1988 | ............. A47J 37/10 |
| WO | 2021118306 A1 | 6/2021 | | |
| WO | 2022036893 A1 | 2/2022 | | |

\* cited by examiner

NONSTICK PAN AND MANUFACTURING METHOD THEREOF

CROSS REFERENCE TO THE RELATED APPLICATIONS

This application is based upon and claims priority to Chinese Patent Application No. 202323287297.8, filed on Dec. 4, 2023, the entire contents of which are incorporated herein by reference.

TECHNICAL FIELD

The present disclosure relates to a nonstick pan.

BACKGROUND

Nonstick pans rely on a nonstick coating layer on the inner surface of the pan body to achieve their nonstick effect. Common nonstick coating layers with the best nonstick performance include Teflon and ceramic coating layers.

However, nonstick coating layers are prone to peeling off under external forces. To solve this technical problem, United States (US) patent application US20150157160A1 provides a cooking vessel and a method for manufacturing the same. The cooking vessel is provided with a plurality of concave and convex portions, and the convex portions are protrudingly formed to a shape of a dotted line on the bottom surface of the cooking vessel, thus maximizing a nonstick effect to prevent food from sticking to the bottom surface of the cooking vessel. A coating liquid with a nonstick function is applied to the surface of a stainless steel plate to form a coating layer on the concave and convex portions, and the coating layer on the convex portions is removed. In this case, the convex portions play a protective role, preventing the coating layer from peeling off under external forces.

The US patent application US20150157160A1 has the following drawbacks. The convex portions on the bottom surface of the cooking vessel are regularly combined into a beehive (hexagonal) pattern. The nonstick coating layer inside the hexagon is exposed and prone to peeling off due to external forces. To solve this problem, it is necessary to minimize the area enclosed by the hexagon. However, reducing the area enclosed by the hexagon will create another problem. That is, the convex portions will occupy most of the inner surface of the cooking vessel, resulting in a significant reduction in the area of the nonstick coating layer. In addition, overly dense convex portions are equivalent to solid lines or blocks to some extent, causing most of the food to stick to the convex portions not covered by the nonstick coating layer during cooking. With a significant reduction in the area of the nonstick coating layer and most of the food sticking to the convex portions, the nonstick effect of the nonstick cooking vessel is greatly reduced.

SUMMARY

In order to overcome the shortcomings of the existing nonstick pans, the present disclosure provides a nonstick pan, ensuring the nonstick effect of the nonstick pan and reducing the external force on the nonstick layer.

In order to solve the technical problem, the present disclosure adopts the following technical solutions. A nonstick pan includes a pan body, where an inner surface of the pan body is provided with protruding dots; and the protruding dots are distributed in the following pattern:

the protruding dots include a central protruding dot and surrounding protruding dots;

the central protruding dot is located at a center of the inner surface of the pan body;

the central protruding dot is surrounded by protruding dot rings that are distributed from inside to outside around the central protruding dot; the protruding dot ring includes a plurality of surrounding protruding dots separated from each other; and the central protruding dot and the surrounding protruding dots have a same protrusion height H; and concave portions are formed between the central protruding dot and the surrounding protruding dot and between the surrounding protruding dots on the inner surface of the pan body; and a nonstick layer is provided on the concave portions on the inner surface of the pan body, not on the central protruding dot and the surrounding protruding dots.

Further, the protruding dots each are provided with a non-angular surface.

Further, the protruding dots each are provided with a curved surface.

Further, the protruding dots each have a width of preferably 0.2-1 mm, more preferably, 0.3-0.5 mm.

Further, the protruding dot rings are circular; a spacing between the protruding dot ring closest to the central protruding dot and the central protruding dot is $L_1$; neighboring protruding dot rings are equally spaced, with a spacing of $L_2$; neighboring surrounding protruding dots in each protruding dot ring are equally spaced, with a spacing of $L_3$, where H=0.05-0.2 mm (more preferably, 0.05-0.1 mm); $L_1$=0.5-2.5 mm (more preferably, 1-1.5 mm). $L_2$=0.5-2.5 mm (more preferably, 1-1.5 mm); and $L_3$-0.5-2.5 mm (more preferably, 1-1.5 mm); and alternatively, the protruding dot rings are regular polygons; spacing between a side of the protruding dot ring closest to the central protruding dot and the central protruding dot is $L_1$; sides of neighboring protruding dot rings are equally spaced, with a spacing of $L_2$; neighboring surrounding protruding dots in each protruding dot ring are equally spaced, with a spacing of $L_3$, where H=0.05-0.2 mm (more preferably, 0.05-0.1 mm). $L_1$-0.5-2.5 mm (more preferably, 1-1.5 mm); $L_2$=0.5-2.5 mm (more preferably, 1-1.5 mm); and $L_3$=0.5-2.5 mm (more preferably, 1-1.5 mm).

A manufacturing method of the nonstick pan includes the following steps:

S1: preparing a metal plate, and forming the central protruding dot and the protruding dot rings on a surface of the metal plate by laser engraving, mechanical processing, die stamping, or etching;

S2: forming the plate into the pan body;

S3: sandblasting the pan body to make the central protruding dot and the surrounding protruding dots non-angular;

S4: coating the nonstick coating layer onto the inner surface of the pan body; and S5: removing the nonstick coating layer on surfaces of the protruding dots.

Further, step S5 includes: removing the nonstick coating layer on the surfaces of the protruding dots by grinding.

Beneficial Effects. The present disclosure ensures the nonstick effect of the nonstick pan and reduces the external force on the nonstick layer.

DETAILED DESCRIPTION OF THE EMBODIMENTS

The present disclosure is described in further detail below with reference to the drawings and specific implementations.

Figure 1:
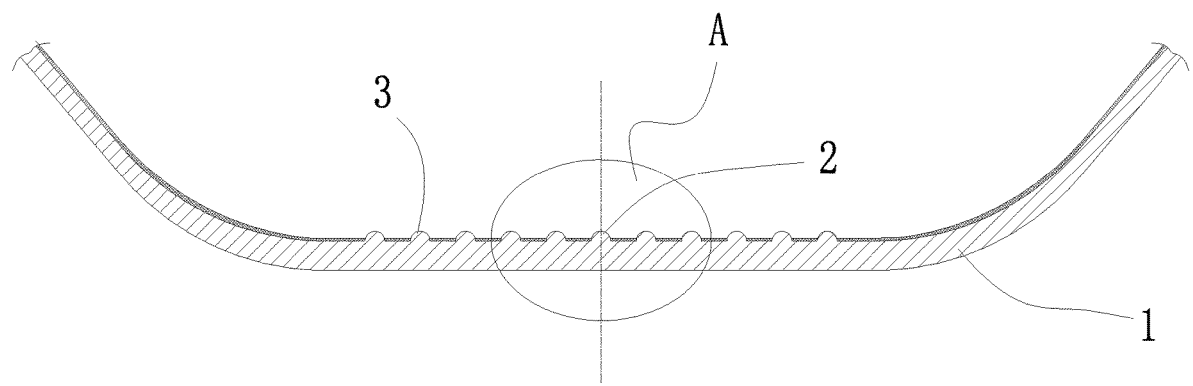
FIG. 1 is a section view of a nonstick pan according to the present disclosure.
Figure 2:
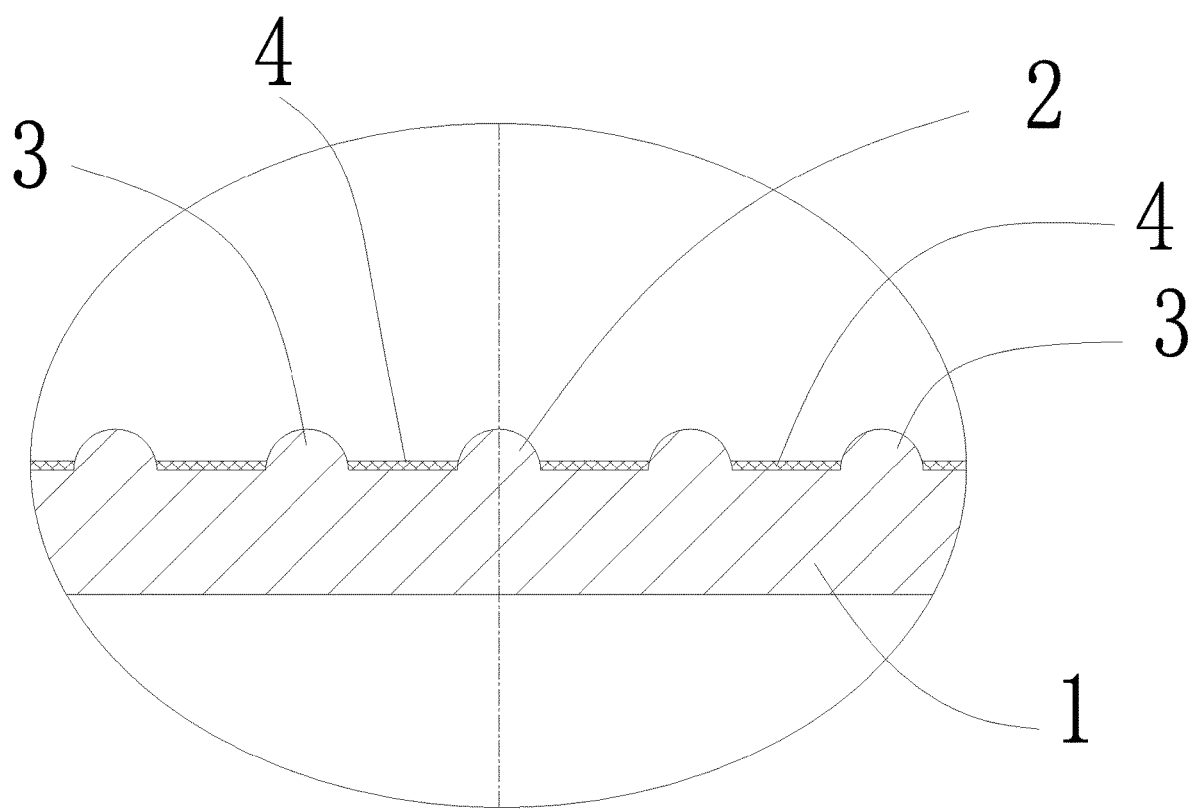
FIG. 2 is a partially enlarged view of the nonstick pan shown in FIG. 1.
Figure 3:
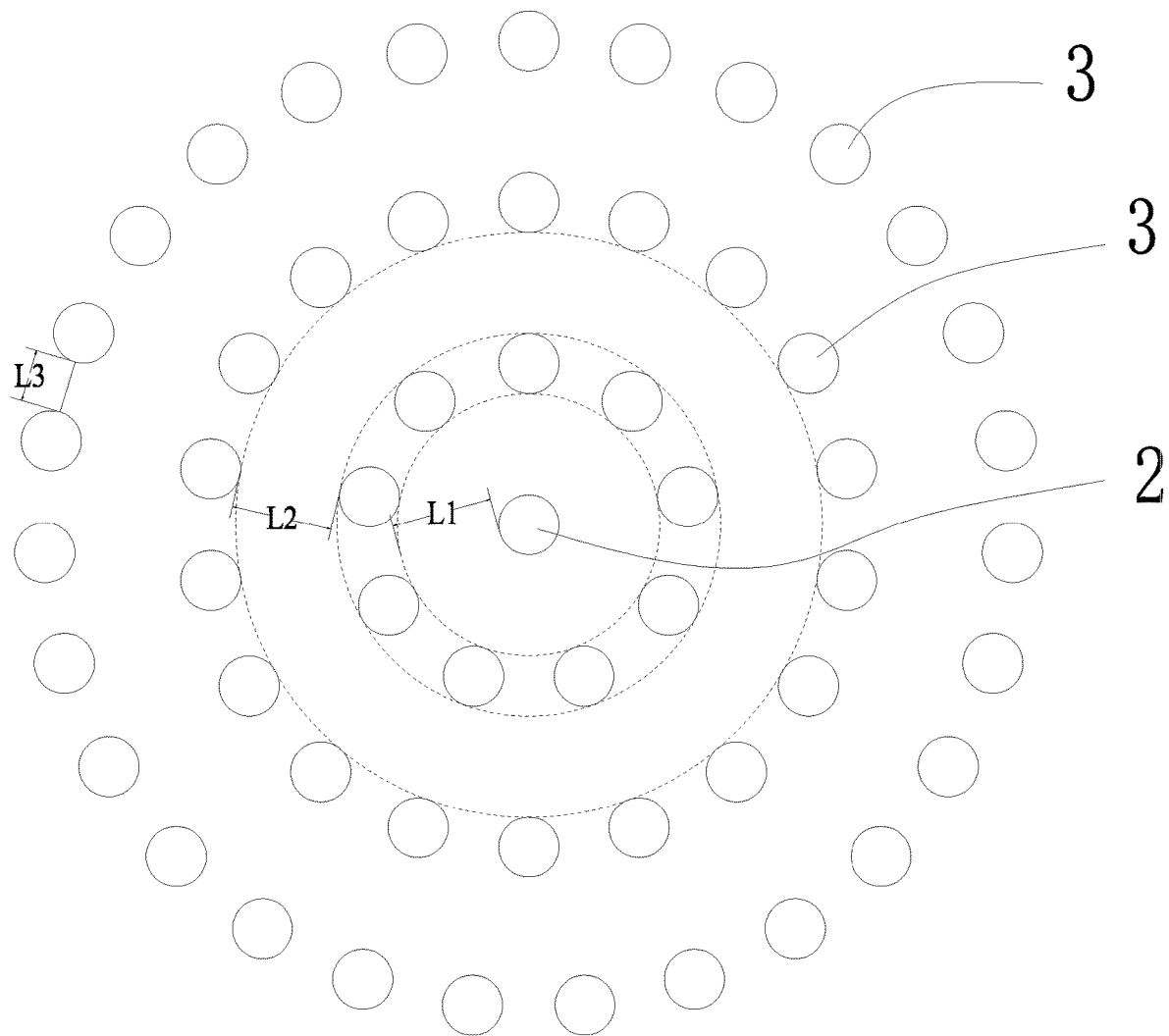
FIG. 3 is a plane layout of a central protruding dot and surrounding protruding dots.

As shown in FIGS. 1 to 3, a nonstick pan includes pan body 1. An inner surface of the pan body 1 is provided with protruding dots. The protruding dots are distributed in the following pattern.

The protruding dots include central protruding dot 2 and surrounding protruding dots 3.

The central protruding dot 2 is located at a center of the inner surface of the pan body 1. The central protruding dot 2 is surrounded by protruding dot rings. The protruding dot rings are distributed from inside to outside around the central protruding dot 2. The protruding dot ring includes a plurality of surrounding protruding dots 3 separated from each other. The central protruding dot 2 and the surrounding protruding dots 3 have same protrusion height H. Concave portions are formed between the central protruding dot 2 and the surrounding protruding dot 3 and between the surrounding protruding dots 3 on the inner surface of the pan body. Nonstick layer 4 is provided on the concave portions on the inner surface of the pan body, not on the central protruding dot 2 and the surrounding protruding dots 3.

In the utility model, the surrounding protruding dots around the central protruding dot 2 spread outward in a ring shape, ensuring the nonstick effect of the nonstick pan and reducing the external force on the nonstick layer. The design principle is as follows.

The external force applied to the nonstick pan mainly comes from the scraping of a spatula on the inner surface of the pan body. Regardless of the angle at which the spatula scrapes into the pan body, it generally scrapes from a radial direction of the pan body. The protruding dots that spread outward in a ring pattern naturally receive the scraping force from the spatula in the radial direction. The probability that the spatula just scrapes into the concave portions between the protruding dot rings is extremely small. Therefore, spacing between the protruding dot rings can be appropriately enlarged, which can also achieve the goal of reducing the external force on the nonstick layer. When the spacing between the protruding dot rings is appropriately enlarged, the area of the nonstick layer on the concave portions will not be greatly affected, and the effective cooking area of the nonstick pan will not be greatly affected by the protruding dots. Therefore, a large area of nonstick coating layer ensures the nonstick property of the nonstick pan.

In addition, when the spacing between the protruding dot rings is appropriately enlarged, the protruding dot rings are not likely to be too dense. During cooking, the protruding dot rings can effectively hold the food up, and there is not much sticking between the food and the protruding dot rings. In addition, the spacing between the protruding dots can also store oil appropriately, further ensuring the nonstick performance of the nonstick pan.

Preferably, the protruding dots (including the central protruding dot 2 and the surrounding protruding dots 3) each are provided with a non-angular surface to reduce the resistance encountered by the spatula when it is inserted into the pan body and to reduce the scraping force of the spatula on the protruding dots, thus preventing the protruding dots from being scraped off. More preferably, the protruding dots each are provided with a curved surface.

Preferably, the protruding dots (including the central protruding dot 2 and the surrounding protruding dots 3) each have a width of 0.2-1 mm (more preferably, 0.3-0.5 mm). The width of the protruding dot refers to a size of a widest portion of the protruding dot, which defines the size of the protruding dot. Too large protruding dots are prone to sticking to food, while too small protruding dots cannot hold food up and protect the nonstick layer.

Most preferably, the protruding dot rings are circular. A closest spacing between the protruding dot ring closest to the central protruding dot and the central protruding dot 2 is $L_1$. Neighboring protruding dot rings are equally spaced, with a spacing of $L_2$. Neighboring surrounding protruding dots 3 in each protruding dot ring are equally spaced, with a spacing of $L_3$. H=0.05-0.2 mm (more preferably, 0.05-0.1 mm). $L_1$-0.5-2.5 mm (more preferably, 1-1.5 mm). $L_2$=0.5-2.5 mm (more preferably, 1-1.5 mm). $L_3$-0.5-2.5 mm (more preferably, 1-1.5 mm).

As shown in FIG. 3, when the protruding dot ring is circular, $L_1$ denotes spacing between an edge of the central protruding dot 2 and an inner circle of the closest protruding dot ring. $L_2$ denotes spacing between an outer circle of an inner protruding dot ring and an inner circle of an outer protruding dot ring. $L_3$ denotes spacing between each two neighboring protruding dots in the protruding dot ring.

Figure 4:
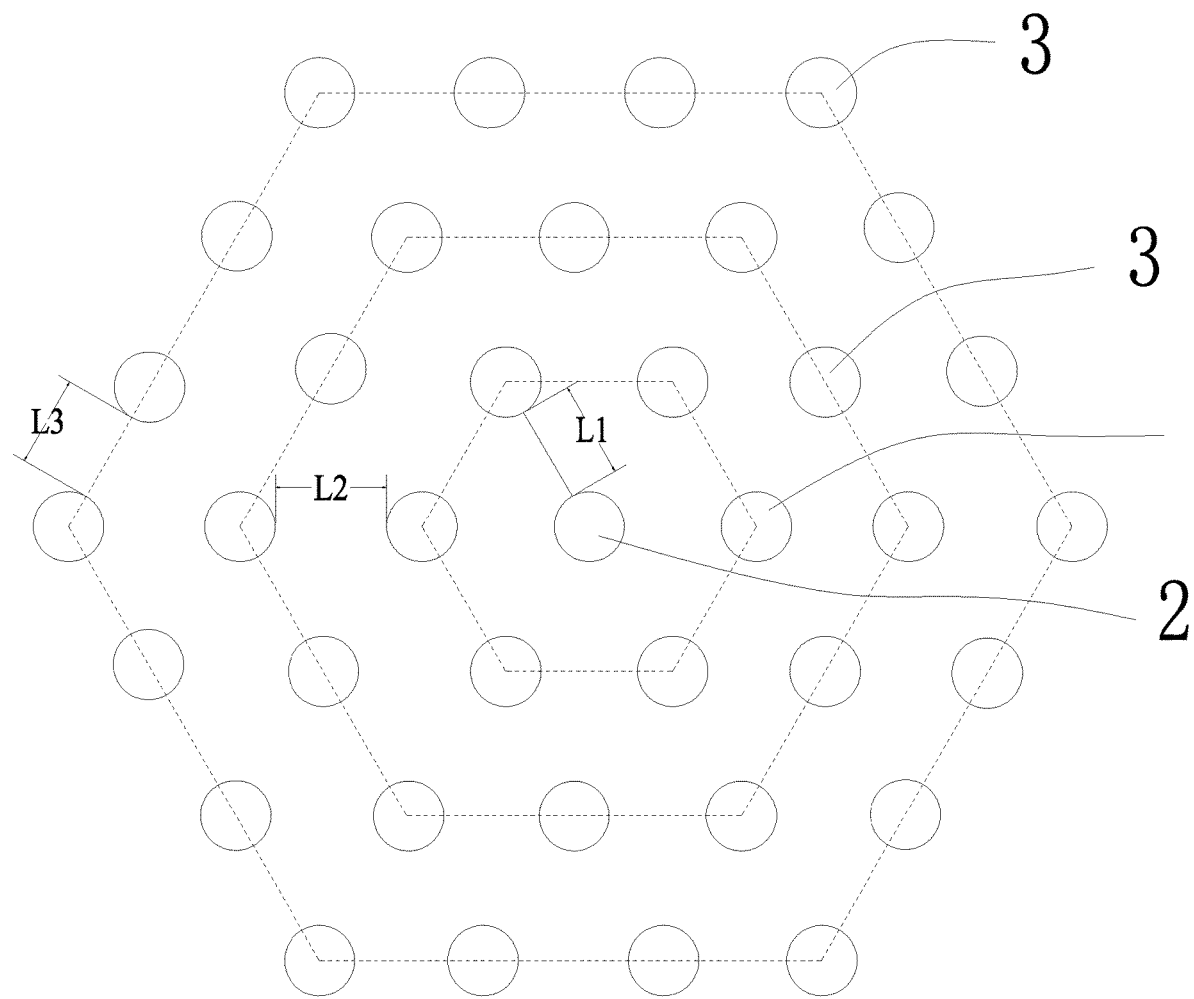
FIG. 4 is another plane layout of the central protruding dot and the surrounding protruding dots.

Of course, as shown in FIG. 4, the protruding dot ring can also be a regular polygon (FIG. 4 shows a regular hexagon). Spacing between a side of the protruding dot ring closest to the central protruding dot and the central protruding dot is $L_1$. Sides of neighboring protruding dot rings are equally spaced, with a spacing of $L_2$. Neighboring surrounding protruding dots in each protruding dot ring are equally spaced, with a spacing of $L_3$. H=0.05-0.2 mm (more preferably, 0.05-0.1 mm). $L_1$=0.5-2.5 mm (more preferably, 1-1.5 mm). $L_2$=0.5-2.5 mm (more preferably, 1-1.5 mm). $L_3$-0.5-2.5 mm (more preferably, 1-1.5 mm).

As shown in FIG. 4, when the protruding dot ring is a regular polygon, $L_1$ denotes spacing between the edge of the central protruding dot 2 and an edge of the closest surrounding protruding dot. $L_2$ denotes a closest spacing between the surrounding protruding dot of an inner protruding dot ring and the surrounding protruding dot of an outer protruding dot ring. $L_3$ denotes spacing between each two neighboring protruding dots in the protruding dot ring.

H cannot be too large or too small. If H is too large, the protrusion height of the protruding dot is too large, making it hard to exert the nonstick performance of the nonstick layer, thus affecting the nonstick performance of the nonstick pan. If H is too small, the protrusion height of the protruding dot is too low, making it hard to achieve the functions of protecting the nonstick layer, storing oil in the convex portions, and holding food up. $L_1$, $L_2$, and $L_3$ cannot be too large or too small. If $L_1$, $L_2$, and $L_3$ are too large, the area of the convex portions is too large, causing the spatula to easily scrape into the concave portions, thus damaging the nonstick layer. If $L_1$, $L_2$, and $L_3$ are too small, the protruding dots are too dense. In the case of a significant reduction in the area of the nonstick coating layer and sticking of most food to the convex portions, the nonstick effect of the nonstick pan will be greatly reduced. The above parameters are set based on extensive research efforts to achieve the following optimal effects: ensuring that the inner surface of the pan body has a considerable area of nonstick layer, maximizing the nonstick performance of the nonstick pan, and achieving a balance between the nonstick coating layer on the concave portions and reducing external forces.

A manufacturing method of the nonstick pan includes the following steps.

S1. A metal plate is prepared, and the central protruding dot and the protruding dot rings are formed on a surface of the metal plate by laser engraving, mechanical processing, die stamping, or etching.

S2. The plate is formed into the pan body 1.

S3. The pan body is sandblasted to make the central protruding dot 2 and the surrounding protruding dots 3 non-angular.

S4. The nonstick coating layer 4 is coated onto the inner surface of the pan body.

S5. The nonstick coating layer on surfaces of the protruding dots is removed, for example, by grinding.

In this specification, the schematic representations of the above terms do not necessarily refer to the same embodiment or example. In addition, the specific features, structures, materials, or characteristics described may be combined in any suitable manner in any one or more embodiments or examples.

The foregoing illustrates the implementation of the present disclosure. However, the present disclosure is not limited to the aforementioned implementation. Any modifications, equivalent substitutions, improvements, etc. made within the spirit and scope of the present disclosure should be included within the protection scope of the present disclosure.

What is claimed is:

1. A nonstick pan, comprising a pan body, wherein an inner surface of the pan body is provided with protruding dots; and the protruding dots are distributed in the following pattern:
   the protruding dots comprise a central protruding dot and surrounding protruding dots;
   the central protruding dot is located at a center of the inner surface of the pan body;
   the central protruding dot is surrounded by protruding dot rings, wherein the protruding dot rings are distributed from inside to outside around the central protruding dot; each of the protruding dot rings comprises the surrounding protruding dots separated from each other; and the central protruding dot and the surrounding protruding dots have a same protrusion height H; and
   concave portions are formed between the central protruding dot and each of the surrounding protruding dots and between the surrounding protruding dots on the inner surface of the pan body; and a nonstick layer is provided on the concave portions on the inner surface of the pan body, not on the central protruding dot and the surrounding protruding dots, wherein
   H=0.05-0.2 mm.

2. The nonstick pan according to claim 1, wherein the protruding dots each are provided with a non-angular surface.

3. The nonstick pan according to claim 2, wherein the protruding dots each are provided with a curved surface.

4. The nonstick pan according to claim 3, wherein the protruding dot rings are circular;
   a spacing between the protruding dot ring closest to the central protruding dot and the central protruding dot is $L_1$;
   neighboring protruding dot rings are equally spaced, with a spacing of $L_2$; and
   neighboring surrounding protruding dots in each of the protruding dot rings are equally spaced, with a spacing of $L_3$;
   wherein, $L_1$=0.5-2.5 mm, $L_2$=0.5-2.5 mm, and $L_3$=0.5-2.5 mm.

5. The nonstick pan according to claim 3, wherein the protruding dot rings are regular polygons;
   a spacing between a side of the protruding dot ring closest to the central protruding dot and the central protruding dot is $L_1$;
   sides of neighboring protruding dot rings are equally spaced, with a spacing of $L_2$; and
   neighboring surrounding protruding dots in each of the protruding dot rings are equally spaced, with a spacing of $L_3$;
   wherein, $L_1$=0.5-2.5 mm, $L_2$=0.5-2.5 mm, and $L_3$=0.5-2.5 mm.

6. The nonstick pan according to claim 2, wherein the protruding dot rings are circular;
   a spacing between the protruding dot ring closest to the central protruding dot and the central protruding dot is $L_1$;
   neighboring protruding dot rings are equally spaced, with a spacing of $L_2$; and
   neighboring surrounding protruding dots in each of the protruding dot rings are equally spaced, with a spacing of $L_3$;
   wherein, $L_1$=0.5-2.5 mm, $L_2$=0.5-2.5 mm, and $L_3$=0.5-2.5 mm.

7. The nonstick pan according to claim 2, wherein the protruding dot rings are regular polygons;
   a spacing between a side of the protruding dot ring closest to the central protruding dot and the central protruding dot is $L_1$;
   sides of neighboring protruding dot rings are equally spaced, with a spacing of $L_2$; and
   neighboring surrounding protruding dots in each of the protruding dot rings are equally spaced, with a spacing of $L_3$;
   wherein, $L_1$=0.5-2.5 mm, $L_2$=0.5-2.5 mm, and $L_3$=0.5-2.5 mm.

8. The nonstick pan according to claim 1, wherein the protruding dots each have a width of 0.2-1 mm.

9. The nonstick pan according to claim 8, wherein the protruding dot rings are circular;
   a spacing between the protruding dot ring closest to the central protruding dot and the central protruding dot is $L_1$;
   neighboring protruding dot rings are equally spaced, with a spacing of $L_2$; and
   neighboring surrounding protruding dots in each of the protruding dot rings are equally spaced, with a spacing of $L_3$;
   wherein, $L_1$=0.5-2.5 mm, $L_2$=0.5-2.5 mm, and $L_3$=0.5-2.5 mm.

10. The nonstick pan according to claim 8, wherein the protruding dot rings are regular polygons;
    a spacing between a side of the protruding dot ring closest to the central protruding dot and the central protruding dot is $L_1$;
    sides of neighboring protruding dot rings are equally spaced, with a spacing of $L_2$; and
    neighboring surrounding protruding dots in each of the protruding dot rings are equally spaced, with a spacing of $L_3$;
    wherein, $L_1$=0.5-2.5 mm, $L_2$=0.5-2.5 mm, and $L_3$=0.5-2.5 mm.

11. The nonstick pan according to claim 1, wherein the protruding dot rings are circular;
- a spacing between the protruding dot ring closest to the central protruding dot and the central protruding dot is $L_1$;
- neighboring protruding dot rings are equally spaced, with a spacing of $L_2$; and
- neighboring surrounding protruding dots in each of the protruding dot rings are equally spaced, with a spacing of $L_3$;
- wherein, $L_1$=0.5-2.5 mm, $L_2$=0.5-2.5 mm, and $L_3$=0.5-2.5 mm.

12. The nonstick pan according to claim 1, wherein the protruding dot rings are regular polygons;
- a spacing between a side of the protruding dot ring closest to the central protruding dot and the central protruding dot is $L_1$;
- sides of neighboring protruding dot rings are equally spaced, with a spacing of $L_2$; and
- neighboring surrounding protruding dots in each of the protruding dot rings are equally spaced, with a spacing of $L_3$;
- wherein, $L_1$=0.5-2.5 mm, $L_2$=0.5-2.5 mm, and $L_3$=0.5-2.5 mm.

13. A manufacturing method of the nonstick pan according to claim 1, comprising the following steps:
- S1: preparing a metal plate, and forming the central protruding dot and the protruding dot rings on a surface of the metal plate by laser engraving, mechanical processing, die stamping, or etching;
- S2: forming the metal plate into the pan body;
- S3: sandblasting the pan body to make the central protruding dot and the surrounding protruding dots non-angular;
- S4: coating the nonstick layer onto the inner surface of the pan body; and
- S5: removing the nonstick layer on surfaces of the protruding dots.

14. The manufacturing method according to claim 13, wherein in the nonstick pan, the protruding dots each are provided with a non-angular surface.

15. The manufacturing method according to claim 14, wherein in the nonstick pan, the protruding dots each are provided with a curved surface.

16. The manufacturing method according to claim 13, wherein in the nonstick pan, the protruding dots each have a width of 0.2-1 mm.

17. The manufacturing method according to claim 13, wherein in the nonstick pan, the protruding dot rings are circular;
- a spacing between the protruding dot ring closest to the central protruding dot and the central protruding dot is $L_1$;
- neighboring protruding dot rings are equally spaced, with a spacing of $L_2$; and
- neighboring surrounding protruding dots in each of the protruding dot rings are equally spaced, with a spacing of $L_3$;
- wherein, $L_1$=0.5-2.5 mm, $L_2$=0.5-2.5 mm, and $L_3$=0.5-2.5 mm.

18. The manufacturing method according to claim 13, wherein in the nonstick pan, the protruding dot rings are regular polygons;
- a spacing between a side of the protruding dot ring closest to the central protruding dot and the central protruding dot is $L_1$;
- sides of neighboring protruding dot rings are equally spaced, with a spacing of $L_2$; and
- neighboring surrounding protruding dots in each of the protruding dot rings are equally spaced, with a spacing of $L_3$;
- wherein, $L_1$=0.5-2.5 mm, $L_2$=0.5-2.5 mm, and $L_3$=0.5-2.5 mm.

\* \* \* \* \*